United States Patent [19]

Litch, III

[11] 4,063,060

[45] Dec. 13, 1977

[54] METHODS OF MAKING TORSIONAL VIBRATION ISOLATING MOTOR MOUNTING SYSTEMS AND ARRANGEMENTS

[75] Inventor: Ernest W. Litch, III, Fort Wayne, Ind.

[73] Assignee: General Electric Company, Fort Wayne, Ind.

[21] Appl. No.: 636,547

[22] Filed: Dec. 1, 1975

[51] Int. Cl.² .............................................. B23K 11/14
[52] U.S. Cl. ......................................... 219/93; 29/436; 228/128; 417/360
[58] Field of Search ........................... 29/156.4 R, 436; 219/91, 92, 93; 228/128; 417/360, 423 R

[56] References Cited

U.S. PATENT DOCUMENTS

| 2,451,970 | 10/1948 | Odor | 417/423 R X |
|---|---|---|---|
| 3,067,488 | 12/1962 | Bennett et al. | 219/93 X |
| 3,774,009 | 11/1973 | Hodges | 219/93 X |
| 3,775,029 | 11/1973 | Ranz | 417/423 R |
| 3,803,690 | 4/1974 | Cann et al. | 29/156.4 R |

Primary Examiner—J. V. Truhe
Assistant Examiner—N. D. Herkamp
Attorney, Agent, or Firm—Ralph E. Krisher, Jr.

[57] ABSTRACT

Disclosed subject matter includes flexible motor mounting members particularly adapted for vibration induced flexing movement combined with oscillatory movement about a pivot axis at a point of attachment on a blower housing or other support. Short but strong mounting members are provided that have low torsional mode vibration transmissibilities. Leaf spring mounting arms have low torsional spring constants and yet have sufficient strength to withstand shipping and handling loads for motor assemblies and to permit all angle motor mounting. The mounting member spring constants for axial, radial and tilting vibration modes are selected in specific forms so that the characteristic vibration transmissibility ratios for these modes are each close to unity. However, the characteristic torsional mode vibration transmissibility is substantially less than unity. In particularly preferred embodiments of the invention, sheet steel having a martensitic grain structure is utilized to form the mounting members. Bends in this material have a radius of at least seven times the thickness of the material. One method includes forming lugs or mounting members from the selected material and then trapping one end of these members between oppositely facing surfaces of fastening members. In some forms, the motor shell constitutes one fastening member and a holding plate is another fastening member and it is preferred to capture a motor pad portion of the lug against the motor shell and projection weld the projections from the plate to the motor shell. The free end of the lug is specifically configured to prevent deformation and tearing, and the lugs are extremely easy to mount to a blower housing simply by deflecting the mounting arms (when necessary) with finger pressure so as to align holes in the mounting arms with previously provided holes in the blower housing. In another form, the motor end of mounting lugs are trapped between two pieces of steel that are welded together to form a mounting block having a strap accommodating slot therein.

7 Claims, 28 Drawing Figures

METHODS OF MAKING TORSIONAL VIBRATION ISOLATING MOTOR MOUNTING SYSTEMS AND ARRANGEMENTS

BACKGROUND OF THE INVENTION

The present invention relates generally to methods of making motor mounting systems arrangements that are particularly adapted for interconnecting a motor directly with a blower wheel and blower housing in a manner that provides improved isolation of torsional vibrations and yet also unfailingly provides stringent control of axial and tilting motor movements without excessively amplifying vibrations associated with such movements.

In direct drive blower applications (for example those designed for furnaces and in room air conditioning applications), many different motor vibration isolation schemes have been used in an effort to reduce the noise caused by vibrations transmitted from the motor to the blower housing and any associated connected duct work; or to a support in an air conditioner. Predominant single phase induction motor torsional pulsations or vibrations having a frequency that is equal to or a multiple of twice the line frequency (for example 120 Hz for 60 Hz power supplies and 100 Hz for 50 Hz power supplies) are usually the source of the most objectionable noise in both of the above-mentioned applications and an effective but inexpensive noise isolation scheme for this vibration mode and frequencies is very much needed.

Blower wheels supported within blower housings typically are dimensioned and positioned so that relatively close running tolerances are maintained between each wheel and housing in the interest of maximizing blower efficiency. In direct drive applications, a motor is suspended from the blower housing scroll and the motor shaft in turn supports and drives the blower wheel within the housing. This type of direct drive arrangement is very desirable because of its relative simplicity and economy as compared to other arrangements (e.g., those that require separated components such as belts, pulleys, separate blower wheel bearing systems and supports, etc.). However, with prior direct drive arrangements, it has been necessary to use complex and expensive mounting arms and related parts in order to generally satisfy the requisites of good torsional vibration isolation and acceptable control of other motor movement.

It has long been known that motor vibrations or pulsations may be amplified during transmission to a blower housing, depending on the frequency of vibration and resonant frequency of the mounting system (or parts thereof). Thus, the resonant frequency of each part of such system should be considered in designing a mounting arrangement. However, direct drive blower motors also must be supported with sufficient stiffness or rigidity to prevent sagging or dropping of the motor and to prevent blower assembly damage from "shipping shock" tests or during actual shipping and handling. One primary problem exists because design efforts directed to minimizing the transmission of torsional mode vibrations may well increase the transmission of (or chance of amplification of) axial and tilting mode vibrations and may even excessively reduce the structural integrity of a given arrangement vis-a-vis shipping shock.

Generally speaking, it would be preferable to completely isolate axial mode and tilting mode motor vibrations from a blower housing in direct drive applications. However, the need to rigidly support the motor and blower wheel, and thus maintain a predetermined running clearance between blower parts, has not permitted the use of connections between the motor and blower housing that are sufficiently "soft" to provide such complete isolation.

Typical mobile home furnace blowers utilize motors rated at approximately 373 watts (0.50 hp) or more and having a mass of 5.9 kg (13 pounds) or more. On the other hand, even heavier and more powerful motors often are used in typical residences, offices, and shop areas that utilize air moving blowers. The larger mass of such motors requires even more rigid mounting members for avoidance of tilting problems and shipping shock damage than would be the case with motors of smaller mass such as those used, for example, for window fan applications (typically these motors are rated at 75 watts or less and have a mass of 2.2 kg or less).

Generally speaking, the larger the mass and power of the motor, the more difficult it is to resolve the above-mentioned problems; and solutions applicable to small motor applications are not always applicable to arrangements involving larger motors.

For example, many appliances that incorporate blower mounted motors are subjected to mechanical tests that simulate "shipping shock" — i.e., conditions that might occur during handling and shipping of such appliances. These conditions could be bouncing onto a truck loading dock, rough railway transit, etc. The actual form of the tests may vary for different appliance manufacturers and for different types of appliances. However, one commonly used test procedure is spelled out in a test sequence specification of the "National Safe Transit Committee" (sponsored and coordinated by the Porcelain Enamel Institute, Inc.) for packaged products of one hundred pounds or more. This sequence involves vertically vibrating the packaged product for at least 1 hour at a frequency such that the product will momentarily leave the vibrating table or platform during the vibration cycle; and then permitting movement of the packaged product along an inclined plane until a face or edge of the package impacts against a backstop. This impact test may be carried out with a "Conbur Incline" testing device or other equipment producing equivalent results and a specified shock recorder. Of course, other tests may take place with an appliance unpackaged. In any event, however, after the selected test or test sequence, the appliance itself (e.g., a furnace) is inspected for damage, and such inspection usually involves close scrutiny of any electrical motors to determine that the shafts thereof and mountings therefor have not been deleteriously affected.

Direct drive blower motors often are mounted so that the interface between the mounting means and the blower housing is located along or adjacent to a curved inlet or eye of the blower housing, such curved portion of the housing generally being less flexible and less apt to act as a sounding board for motor induced vibrations, and also being better able to withstand shipping shock that might tend to tear the motor from the housing. It thus would be desirable that any improved arrangements be such that attachment to a blower would be along the curved inlet thereof.

In the past, one approach for mounting motors directly to blowers has involved the use of lugs that were fixed (for example by bolts or by welding) to a motor frame. In some applications utilizing this approach, the lugs were fixed (for example by bolting or welding) directly to a blower housing or scroll without grommets; and in other grommets have been used. In still other blower applications, such lugs have been interconnected with the motor by means of a strap or band.

The general objectives of the mounting arrangements used heretofore have been to provide sufficient mounting rigidity to avoid excessive tilting and axial movement of the motor during operation and to withstand shipping shock, while also attempting to minimize the transmission of vibrations (particularly torsional mode vibrations) to the housing through the motor mounting members. Unfortunately, improvement of a given design for one of these characteristics frequently will have a negative affect on the other characteristics. In addition, it has sometimes been necessary to provide "internal packaging" for arrangements that are good noise suppressors. For example, temporary supplemental supports or pads may be provided in furnace blowers for transit purposes. These supports or pads then are discarded prior to putting the furnace (or other appliance) in operation. Thus, engineering compromises must be made even with the complex known mounting arrangements.

A single member lug arm approach has long been recognized as a preferable form of direct drive motor mount (from a cost standpoint), but such approach simply has not been satisfactory in practice for direct drive blower applications vis-a-vis good torsional mode vibration isolation in combination with good mounting rigidity. For this reason, among others, it has been necessary to use relatively complex mounting arrangements for those applications where maximum isolation of torsional mode noise was to be provided as well as sufficient structural strength to meet shipping shock tests. For example, one prior arrangement has required the use of costly resilient hubs or cushion ring isolators along with a multitude of other different parts that have been assembled together to provide a costly and complex mounting arm assembly.

One or two member lug mounts have also been devised that have been used with ultra-soft or ultra-resilient blower mounting pads or grommets. This particular type of approach, however, can create or aggravate still other problems such as those associated with: motor sag; reduced tilting mode resonant frequency with the result that such frequencies would fall into an amplification range; shipping and handling damage; and overcompression of the pads or grommets (due to the weight of the motor-blower wheel) accompanied with effective stiffening of such pads or grommets.

Although a number of different design and performance criteria have been discussed hereinabove as illustrative of the complexity of the factors that must be satisfied with direct drive motor mounting arrangements, it will be understood that numerous other considerations may further confound the search for a desirable solution to the direct-mounted motor problems mentioned hereinabove. One of these, for example, is the possibility that a given motor mounting arrangement might have to support a motor with its shaft vertical, horizontal, or at some specified angle therebetween in different applications.

Single member types of mounting arms or members for axial air flow fans have been shown in prior literature. For example, Anderson patent No. 1,781,155 shows a motor that is supported by three substantially flat and straight supporting arms, the shaft of which supports a propeller type axial flow fan. Propeller or disc type fan mounting arrangements somewhat similar to Anderson's are also shown in Seyfried patent No. 1,873,343 and Goettl patent No. 2,615,620. In Seyfried, leather, canvas, spring steel, and brass arms are mentioned; and in Goettl, curved arms having arcuate motor embracing portions are illustrated.

Although it is desirable to utilize one piece mounting arms for direct drive blower motors, competitive economics would favor the permanent attachment of such arms to a motor shell during manufacture of the motor. However, for designs having very long arms, increased packaging costs and shipping costs due to increased package volume can offset the cost savings associated with single arm construction. Furthermore, while lengthy arms of the type shown by Seyfried, Anderson, etc. may be made from a choice of different materials (as described, for example, by Seyfried) and have satisfactory strength and torsional vibration transmissibility characteristics; prior attempts to utilize flat single member supports for direct drive blower motors have resulted in mounting arrangements having either unsatisfactory strength characteristics or unsatisfactory torsional vibration transmissibilities.

To be more explicit; it can be assumed that the arms of Goettl, Seyfried, or Anderson (referred to hereinabove) would have sufficient strength to resist failure in either a tensile mode or buckling mode when supporting a propeller fan motor of given mass during a particular test. However, if those arms were shortened to permit mounting of the same motor in a blower housing inlet, even though the arms would still be sufficiently strong to not tear or buckle, the torsional mode vibration transmissibility of such arms would be objectionably increased. For example, an arm shortened from an effective radial extent of about 7.21 inches to an effective radial extent of about 2.2 inches would have a substantially greater transmissibility vis-a-vis 120 hz torsional mode vibrations. On the other hand, if the shortened arms were then further modified by being reduced in thickness and axial width in order to obtain a low transmissibility for torsional vibrations, their resistance to buckling would be reduced about 69%, and their resistance to failure due to tensile stresses would be reduced about 88%.

Accordingly, it would be desirable to provide new and improved methods of making motor mounting systems and arrangements that include relatively short single member mounting arms, motors incorporating the same that are low cost in terms of total material and total labor involved therewith, and yet wherein the resulting systems and arrangements are at least satisfactory if not improved in terms of noise isolation and structural reliability. It would also be desirable to provide methods of making such arrangements that could be easily adapted for use with motors having different housing configurations or that are to be mounted with different shaft orientations.

Accordingly, it is a general object of the present invention to provide new and improved methods of making motor mounting arrangements and systems whereby the abovementioned and other problems may be solved.

It is a more particular object of the present invention to provide new and improved methods of making motor mounting arrangements, and systems of that have good resistance to shipping shock damage even without supplemental or internal packaging, a high degree of rigidity vis-a-vis axial and tilting mode vibrations, and low transmissibility for torsional mode vibrations.

It is a further object of the present invention to provide new and improved methods of making the above-mentioned arrangements and systems, that may be utilized to solve the above-mentioned and other problems, and that may be quickly and easily fastened to a blower or other type of housing.

SUMMARY OF THE INVENTION

In carrying out the above and other objects of the invention, in one preferred form thereof, I provide methods of making new and improved motor mounting systems and arrangements which include single member lugs specifically designed so that the torsional mode resonant or natural frequency is less than twice the frequency of the motor power supply divided by the square root of two ($\sqrt{2}$).

Illustrated mounting arrangements are very "soft" (i.e., they have a low spring constant) with respect to torsional mode vibrations, are "stiff" with respect to axial and tilting mode vibrations, structurally reliable during shipping shock tests, and yet are readily deflectable torsionally for easy assembly with a blower housing.

In specific forms illustrated herein, preferred arrangements include lugs that are flexible in the torsional direction but strong and stiff in the axial and radial directions, thereby to prevent sag or tilt of a direct driven blower wheel and to successfully withstand shipping shock tests.

In more preferred forms that are illustrated herein, arrangements resulting from practice of the invention include flexible members that are particularly adapted for pivotal mounting on a blower housing, i.e., that are particularly adapted to undergo at least limited oscillatory movement about the longitudinal axis of a fastener which attaches a mounting portion of such members to a blower housing. In these forms, short but strong mounting members are provided that also have low torsional mode vibration transmissibilities because of the flexibility of or "springiness" of such members, and also because such vibrations are utilized to oscillate the members about their pivotal mountings.

Mounting systems illustrated herein include flat mounting arms that have low torsional spring constants: and yet have sufficient strength to withstand shipping and handling loads for motor and blower assemblies, and to permit all angle motor mounting. These arms have a unitary motor mounting pad and unitary housing mounting means which are a pad in one form and a tube in another.

The spring constants of the mounting members for axial, radial and tilting vibration modes are selected so that the characteristic vibration transmissibliity ratios for these modes are each close to unity. However, the characteristic torsional mode vibration transmissibility is substantially less than unity. In particularly preferred arrangements, high strength martensitic sheet steel is utilized to form the mounting members.

In carrying out one method that exemplifies one aspect of the invention, lug members are formed from the selected material and then one end of these members is trapped between oppositely facing surfaces of fastening members to provide additional strength. In some forms, the motor shell constitutes one fastening member and a holding plate or pad is another fastening member. With these forms, it is preferred to capture the lug (e.g., with projections on one member that extend along cut-outs in the lug) against the motor shell and then projection weld the projections to the other member. This method protects the martensitic material from being softened and weakened during the welding process. This method also provides a very strong fastening scheme that meets the rigors of shipping and handling as well as the rigors caused by prolonged vibration. The free end of the lug is specifically configured to prevent deformation and tearing at the base of the pad, and the lugs (even when fastened to a motor) are extremely easy to mount to a blower housing simply be deflecting the mounting arms (when necessary) with finger pressure so as to align holes in the mounting arms with previously provided holes in the blower housing.

In accordance with another form of practicing the invention, I trap the motor end of mounting arms between two pieces of steel that, when welded together, form a mounting block having a strap accommodating slot therein. I then tie or strap the assembled blocks and members to a motor shell.

Important advantages are obtained by utilizing trapping means when assembling mounting arms to motor shells or motor shell embracing ligatures. For example, and in addition to preventing welding damage as referred to above, the trapping means may be utilized to reinforce a relatively weak and small motor mounting tab. By this means, mounting arm dimensions may be minimized to further reduce the torsional mode vibration transmissibilities thereof, even though the mounting tab for such an arm would likely be torn from the motor during shipping tests if it were to be riveted, bolted, or welded directly to the motor shell.

Another important advantage of following yet another inventive procedure pursuant to another aspect of the present invention resides in reduced total assembly time and assembly procedure complexities. When carrying out this procedure, I support the shell and at least one reinforcing member, with a mounting arm tab sandwiched therebetween, at a welding station. Projections then are welded to the reinforcing member and/or shell to permanently assemble the shell, mounting arm, and reinforcing member. The shell, mounting arm, and any other parts assembled therewith then are treated (e.g., by phosphatizing and then painting) for appearance and corrosion or rust prevention purposes. Subsequently, a rotatable member is assembled with the shell of a stator and supported within the shell to form a complete motor.

Generally the same procedures mentioned above may be followed when riveting or bolting a mounting arm to the shell, with the rivets or threaded fasteners (in lieu of welded projections) trapping the mounting arm tab between the motor shell and reinforcing means.

The subject matter which I regard as my invention is set forth in the appended claims. The invention itself, however, together with further objects and advantages thereof may be better understood by referring to the following more detailed description taken in conjunction with the drawings.

DESCRIPTION OF THE PREFERRED EMBODIMENTS

Figure 1:
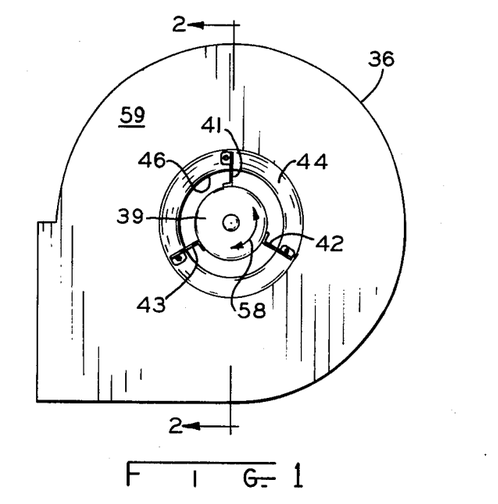
FIG. 1 is a somewhat schematic representation, with parts removed and parts broken away, of a motor blower assembly that may be made by practicing some of the features of my invention.
Figure 2:
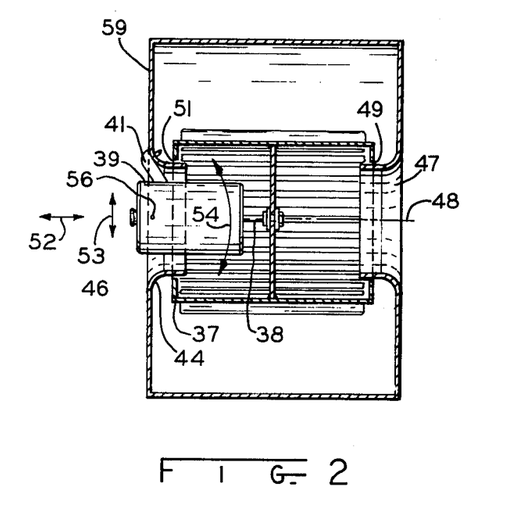
FIG. 2 is a view taken along the line 2—2 in FIG. 1, it being noted that arrows are used in FIGS. 1 and 2 to generally correspond with different vibrational modes.

In FIGS. 1 and 2, there is illustrated a motor mounting system that includes a combination of a blower housing 36, a blower wheel 37 coupled in direct drive relationship with the shaft 38 of a single phase induction motor 39, and three torsionally flexible mounting arms 41, 42, 43.

It will be appreciated that the motor is directly mounted to the blower housing 36 along the curved scroll 44 which defines an air inlet 46 at one side of the housing, the housing also having a second air inlet 47 co-axial with inlet 46 and the rotational axis 48 of motor 39.

Running clearances 49, 51 are provided between the blower wheel 37 and housing 36, and these clearances must be maintained during operation. The amount of clearance may vary from one blower assembly to another, but generally is kept as small as manufacturing tolerances (and a given mounting arrangement) will permit in order to minimize blower losses and thus maximize blower efficiencies.

Vibrations are inherently generated during operation of motor 39. These vibrations have different modes, and four different vibrational modes have been denoted by arrows in FIGS. 1 and 2. With more specific reference to FIG. 2, the motor 37 tends to undergo an axial mode of vibration and thus tends to oscillate in the direction of the arrow 52. In addition, motor 37 tends to vibrate radially as indicated by the arrow 53, and undergo tilting vibratory movement as represented by the arrow 54. For purposes of the present discussion, the tilting mode of vibration of motor 37 may be considered to be a rocking type of movement about the point 56. It will be understood, however, that radial and tilting mode vibrations may occur in planes other than the vertical plane as represented in FIG. 2.

With reference now to FIG. 1, arrow 58 represents the vibratory direction of movement of motor 39 due to torsional mode vibrations of motor 39 about its rotational axis 48 during operation thereof.

Since motor 39 is mounted directly to the blower housing, it will be appreciated that all of the various modes of vibration of the motor may be transmitted directly to the housing 36. The housing 36, in turn, (and particularly the face 59) may then act as a sounding board and may amplify the vibrational sounds and noises transmitted thereto by the motor—depending on the transmissibility of the mounting arrangement for the different vibrational modes. Moreover, these sounds may be transmitted directly through duct work connected to housing 36 or by the air mass being moved by the blower wheel 37.

Prior attempts (of which I am aware) at isolating motor induced vibrations from a blower housing have been directed at minimizing a plurality of the four different vibrational modes represented in FIGS. 1 and 2. However, it has long been known that some of the most objectionable noise transmitted to a blower housing are those vibrations associated with torsional mode vibrations. I have determined that good results can be obtained by minimizing the torsional mode resonant frequency so as to minimize the torsional mode transmissibility, and by concurrently increasing the resonant frequencies for modes of vibration other than torsional in order to establish transmissibilities for those modes as close to unity as is practical. Preferred forms of physical embodiments of the present invention discussed hereinbelow have been devised with this approach in mind.

With reference to FIG. 2, it will be appreciated that whatever changes are made in the mounting arrangement there shown, the running tolerances represented at 49 and 51 must be observed in order to avoid mechanical interference between the blower wheel and blower housing during operation. Unfortunately, some prior effects directed at minimizing tilting, axial, and radial vibration modes have permitted the motor to sag or droop and thus have reduced, if not eliminated, those clearances.

During shipping tests, the motor 31 will tend to move in at least the directions indicated by the arrows 52, 53, and 54, depending upon how the package is being tested. These forces are related to the mass of the motor 39 and will either tend to buckle the radially extending mounting members 41-43, or tend to cause failure in a tensile mode (for example by tearing one or more of these members from the blower housing or motor, by stretching one or more of them, or by actually fracturing due to tensile stresses).

Figure 3:
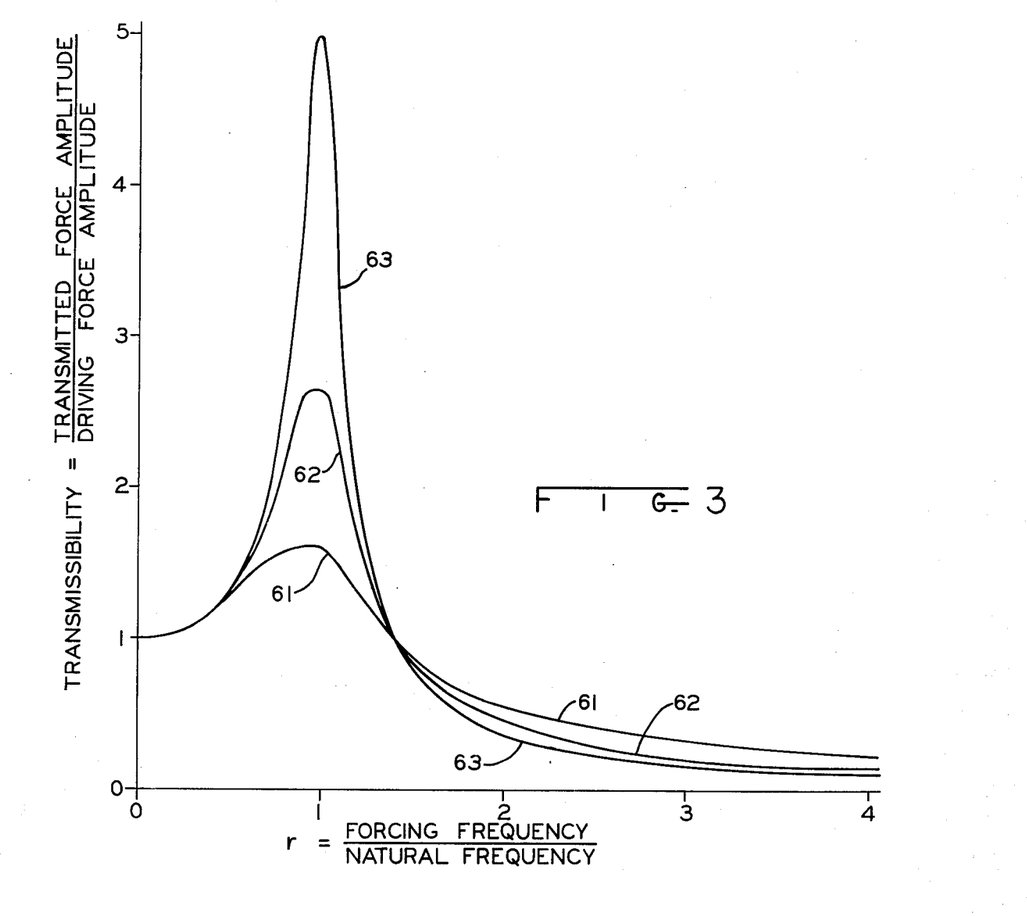
FIG. 3 is a plot of general transmissibility curves, with transmissibility plotted versus the ratio of forcing frequency to natural frequency for different damping factors; this figure being useful in explaining some of the benefits associated with utilization of the present invention.

Three curves 61, 62, and 63 are shown in FIG. 3. These curves are referred to as general transmissibility curves and have been included herein for purposes of discussion. These curves will be familiar to persons skilled in the art but, for those less skilled, a more thorough understanding may be attained by referring to standard vibration analysis reference works. One such reference is a book entitled "*Fundamentals of Vibration Analysis*" by N. O. Myklestad, published by the McGraw-Hill Book Company in 1956, and assigned Library of Congress catalog number 55-11932.

Considering only curve 61 for the moment, FIG. 3 represents the relationship between the transmissibility (defined as the ratio of the amplitude of the transmitted force to the driving force) of a given vibrating system to a ratio "$r$" which is defined as the ratio of the forcing frequency to the natural frequency of the system. If a system were to have an infinitely great natural or resonant frequency, "$r$" would approach zero, and the transmissibility of such system would be one, so the amplitude of forces transmitted by the system would be the same as the amplitude of the driving or exciting vibratory force. On the other hand, if the natural frequency of the system were an extremely small fraction of the forcing or driving frequency, the transmissibility would approach zero.

The knee in the curve 61 in the vicinity of $r = 1$ is related to the amount of damping in the system and the curves 61, 62, and 63 are each drawn for a different damping factor (this term is defined in the above referenced Myklestad book). More specifically, curve 61 is for a system where the damping factor is equal to 0.4; curve 62 is plotted for a damping factor of 0.2; and curve 63 is plotted for a damping factor of 0.1.

In preferred physical embodiments of the present invention, motor supporting arrangements are designed so that the transmissibility of motor induced torsional mode vibrations to the blower housing is less than one and so that the ratio $r$ is greater than $\sqrt{2.0}$. On the other hand, these embodiments are designed so that the ratio $r$ will be 0.3 or less for all vibrational modes other than torsional. Therefore, the transmissibility of the mounting arrangement with regard to axial mode, radial mode, and tilting mode vibrations will be close to unity. More specifically, preferred systems are devised to have natural frequencies in the axial, radial, and tilting modes that are at least 3 to 4 times greater than an expected fundamental forcing frequency of 100 or 120 hertz so that the ratio $r$ of forcing frequency to natural frequency for the component mounting arms for these modes will be no more than about 0.3 but preferably even less.

Figures 4, 5:
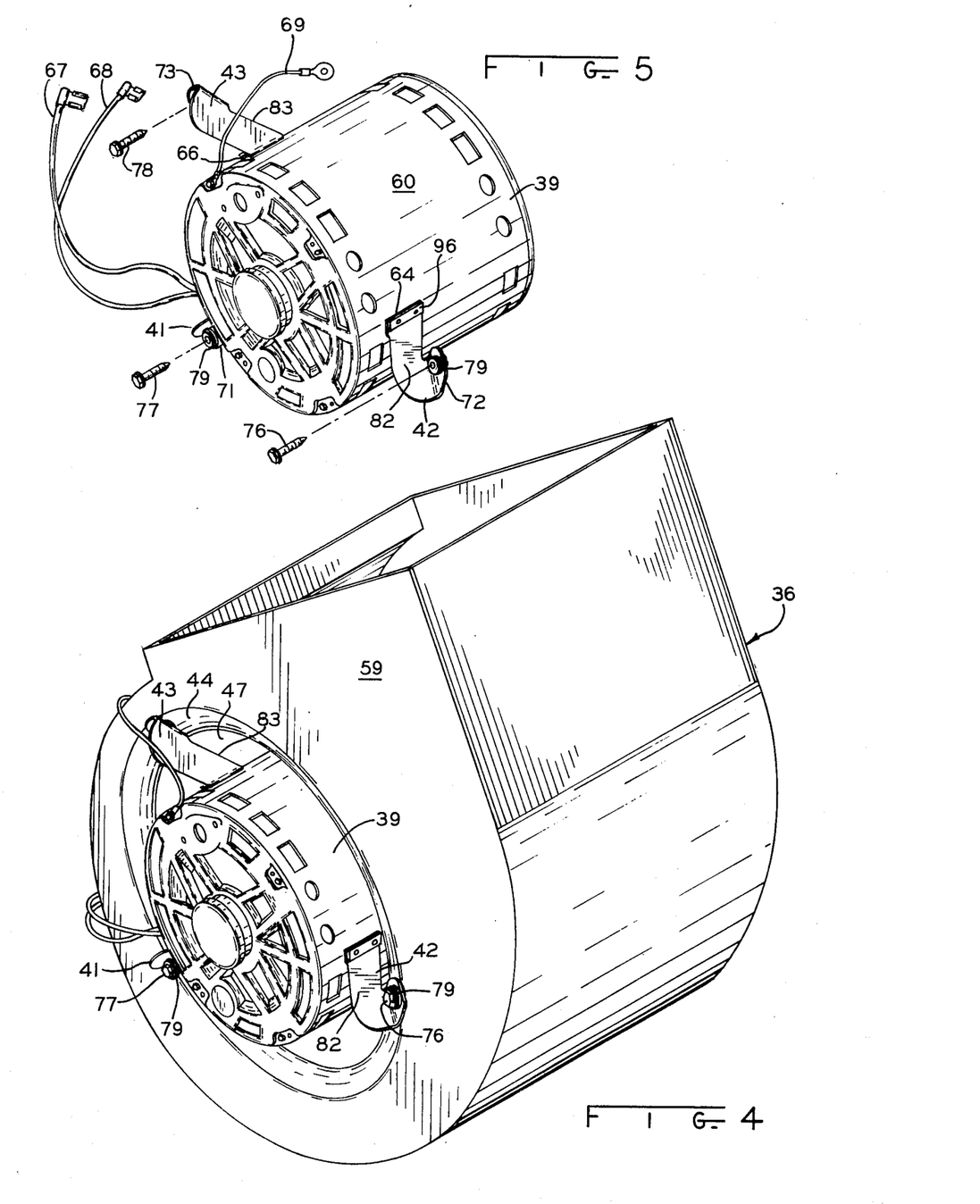
FIG. 4 is a perspective view of the motor blower assembly of FIGS. 1 and 2.
FIG. 5 is an exploded perspective of parts of the structure shown in FIG. 4.

Turning now to FIGS. 4 and 5, the spatial and geometric proportions and relationships of the blower housing 36, motor 39, and mounting arms 41-43 will be described in more detail. It will be noted that in the preferred forms illustrated in FIGS. 4 and 5, the motor ends 64-66 of mounting arms 41-43 are tightly fixed to the housing or shell 60 of the motor 39 to prevent being torn from the motor during rough shipping or handling (or tests simulating the same). The blower ends 71-73 of the arms 41-43 are fastened to the blower scroll 44 by means of self-tapping threaded fasteners 76-78. It will be noted, however, that other types of fastening elements may be used.

As will be understood, a pair of motor leads 67, 68 are provided which, when connected across a source of excitation voltage, will cause operation of the motor, it being noted that additional leads will be provided for multi-speed operation. Moreover, a grounding lead 69 is connected to the conductive housing of the motor and may be connected to the blower housing itself or any other suitable grounded structure.

The fasteners 76-78 (see FIG. 4) are each tightened down against a grommet (such as the grommet 79) carried in an aperture in the blower end of each mounting arm. Although the fastener is drawn down against the grommet so as to hold the motor 39 rigidly in place with respect to movement in the tilting, axial, or radial modes; the blower ends or blower mounting pads 71 of the arms 41-43 are held only loosely to the blower scroll 44 with respect to torsional mode movements.

It will be noted that each blower mounting pad 71 is offset relative to the major, radially extending portion 81-83 of each mounting arm 41-43. Thus, the fastener accommodating aperture formed in the free or blower ends of the mounting arms is offset and each arm is capable of oscillating or pivoting about its fastener. Therefore, the fasteners 78 serve the purpose of holding the motor to the blower housing but also serve as pivot pins for the mounting arms.

Figure 23:
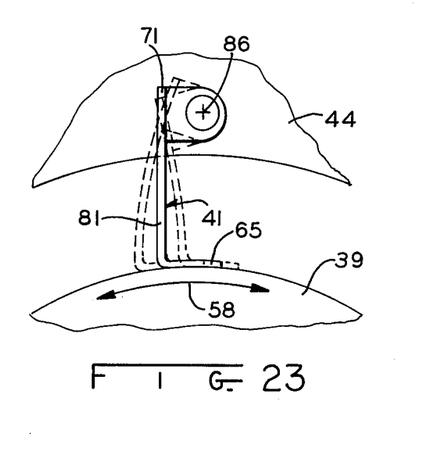
FIG. 23 is a schematic representation of vibratory movement that is useful when describing what are believed to be vibratory movements of structures assembled according to one form.

Reference is now made to FIG. 23 which clearly reveals, in phantom, the oscillatory movement of mounting arm 41 in response to torsional mode vibrations of motor 39 when it is mounted to the scroll 44 in the manner described hereinabove. It will be noted that the intermediate portion 81 of mounting arm 41 is free to flex or bend in the manner of a leaf spring. This flexing is further enhanced by the freedom of the pad 71 to undergo pivotal movement relative to the mounting axis 86.

Figures 9, 10, 11, 12, 13:
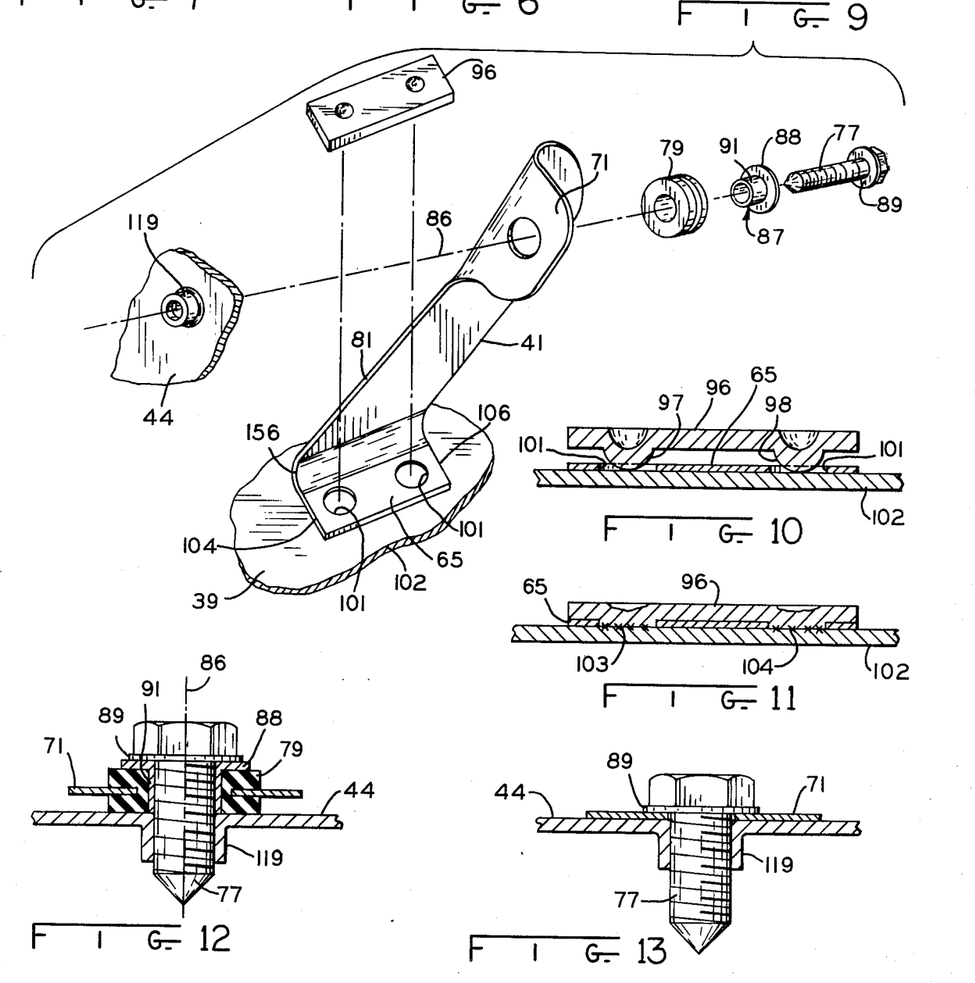
FIG. 9 is an exploded perspective view of portions of the structure shown in FIG. 3.
FIGS. 10 and 11 are sequential views that are useful in explaining the practice of one method of the invention in conjunction with connecting a mounting arm motor pad or tab with a motor shell.
FIG. 12 is an enlarged view, with parts removed and parts in section, showing the mounting interface of the mounting arrangement of the motor and blower housing of FIG. 4.
FIG. 13 generally corresponds to FIG. 9 but illustrates a modified motor-to-housing connection approach.

With reference now to FIGS. 9 and 12, one means by which pivotal movement of the illustrated mounting arms may be encouraged will be described. FIG. 9 reveals stiff spacing means in the form of a steel eyelet or sleeve 87 which prevents gripping the mounting arm 41 so tightly with grommet 79 that arm 41 will not be free to pivot about the axis 86 relative to the blower housing.

FIG. 12 shows that one portion of the grommet 79 cushions the pad 71 and prevents it from making direct metal to metal contact with the housing. Metal to metal contact between the pad 71 and either the eyelet portions 88 or 91, 87 or screw 77 also is prevented by another portion of the same grommet. Eyelet 87 includes a flange or shoulder 88 which conveniently provides a bearing surface for the head 89 of screw 77 (or a washer positioned thereunder when desired). With the arrangement illustrated in FIG. 12, the fastener 77 may be drawn down very tightly so that tubular portion 91 of eyelet 87 bears against scroll 44, and the motor thus is supported in a desired position without droop or sag. Moreover, with the arrangement illustrated in FIG. 12, the natural frequencies of the entire mounting system — vis-a-vis radial, tilting, and axial mode vibrations — will be very high with the result that a transmissibility approaching unity for each of these modes will be provided, this being one of the above stated objectives of preferred forms of structures made by practicing the invention.

The axial length of the tubular portion 91 of the eyelet is selected in conjunction with the height of the grommet 79 so that the grommet 79 is not too tightly compressed in gripping relation with the blower pad 71 even though screw 77 is drawn tightly against the eyelet 87. Thus, mounting arm 41 (as well as mounting arms 42 and 43 in FIG. 1) is able to oscillate about axis 86 during operation.

Substantially improved results are obtained when mounting arrangements are made pursuant to FIGS. 4–12 of the drawings herein. While the combination of a leaf spring type single element mounting arm which is pivotal at its free end is important for obtaining the most desirable results, other structural criteria must also be provided for in order to provide an operative structure.

Figure 24:
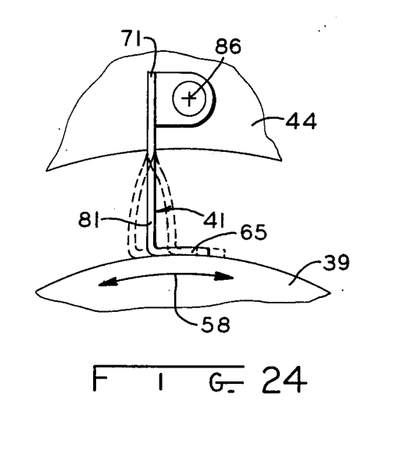
FIG. 24 is a view somewhat similar to FIG. 20, and is useful when describing what are believed to be vibratory movements of structures assembled in yet another manner.

Test results have shown that, for one arrangement substantially as shown in FIGS. 9 and 12, the natural frequency of such arrangement for torsional mode vibrations of 120 Hz was only about 26.6 Hz, which is quite desirable. On the other hand, when the grommet 79 was omitted for the same arrangement, and pad 77 was bolted tightly to the blower housing as illustrated in FIG. 13, the torsional mode natural frequency of the system for a forcing frequency of 120 Hz was about 33 Hz; and the motion of arm 41 was then (it is believed) as illustrated in FIG. 24. Although the vibration isolation characteristics of the FIG. 13 arrangement were not as good as those of the FIG. 12 arrangement, the performance of a FIG. 13 type of arrangement would still be sufficient for many applications presently being served by more complex and expensive prior art arrangements (e.g., by those of the type shown in FIGS. 25 and 26 herein).

Figure 6:
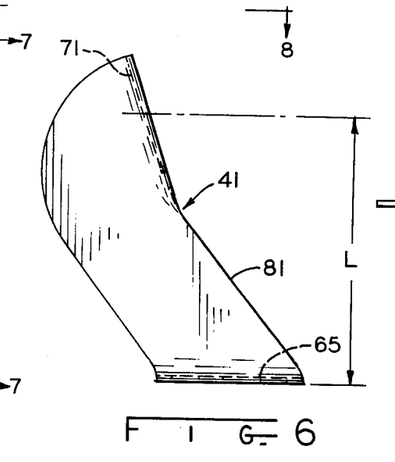
FIG. 6 is a side elevation of one mounting arm utilized in the arrangement of FIG. 3 and also shown attached to the motor of FIG. 2.
Figure 7:
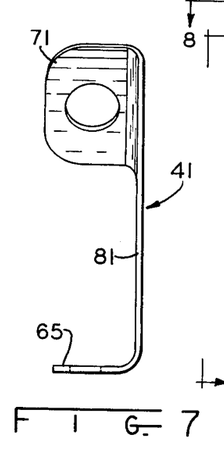
FIG. 7 is a view taken along line 7—7 in FIG. 6.
Figure 8:
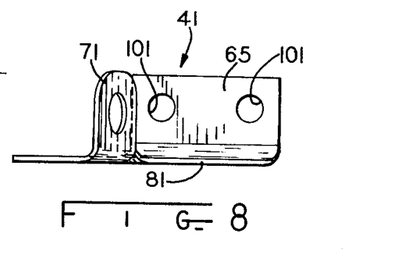
FIG. 8 is a view taken along line 8—8 in FIG. 6.

For small effective radial lengths (i.e., where the effective radial dimension L in FIG. 6 was 2.2 inches), mounting arrangements using mounting members configured exactly as shown in FIGS. 6–8 have failed during testing. More specifically, conventional cold rolled steel and conventional spring steels simply have not had suitable physical characteristics. However, short arms (i.e., arms with a length L of about 3.5 inches [8.9 cm]) or less can be made to perform satisfactorily when they are fabricated from martensitic steel. Martensitic steel, as will be understood, is steel that has been specially processed to transform the microstructure of the material to martensite from, for example, austenite. This type of steel typically will have a tensile strength of from about 130,000 psi to at least about 220,000 psi. It has now been determined that such material having a tensile strength of about 140,000 psi or more is well suited for use in practicing the present invention. More expensive alloy steels and stainless steels may also be used, provided they have a martensitic microstructure, but the use of such materials would represent a greater expense as compared to low carbon, alloy free, martensitic cold rolled steel. This more economical material is commercially available and may be purchased, for example, from Inland Steel Co. Another source of relatively inexpensive martensitic steel is the Athenia Steel Division, Division of the National-Standard Co. of Clifton, N.J.

Review of FIG. 9 will quickly reveal that a better approach is to stamp a mounting arm blank and form (i.e., "bend") the ends thereof to establish the motor mounting tab and housing mounting means. Since low carbon steels (e.g., 0.25% or less carbon) generally are more easily formed than higher carbon (e.g., 0.50% or more carbon) steels, it is preferred to use a relatively low carbon steel such as that manufactured by Inland Steel Co. and marketed under the name "MartInsite" steel by that company.

If the arms 41-43 were proportionately larger so that the length "L" (see FIG. 6) were much longer (e.g., 10 inches), conventional cold rolled steel could almost certainly be used satisfactorily, but it is emphasized that many of the novel approaches described herein are addressed to those problem applications where short mounting arms must be used (e.g. where "L" is about 4 inches or less).

Even when martensitic steel is utilized for lugs 41-43, other steps must be taken in order to ensure that the mounting arrangement is sufficiently strong (even though only marginally so in some cases) to meet the rigors of shipping tests. In order to provide the desired low torsional mode resonant frequencies that are needed, the arms 41-43 are formed of very thin material (e.g., about .035 of an inch or 0.9 mm); and the satisfactory attachment of such material to the shell of motor 39 is difficult to accomplish. For example, direct welding of motor holding means such as pad 65 to motor shell 102 would be convenient and inexpensive. However, the heat associated with welding can cause an undesirable transformation of the martensitic microstructure of arm 41. This type of change would be accompanied by a reduction in strength, and failure of arm 41 in the region of bend 156 or at the weld locations would occur.

Thus, practical alternatives would be to utilize a structural adhesive, such as epoxy, to adhere pad 65 to shell 102, but care must be used to select an adhesive of sufficient strength to withstand all tests contemplated; and the adhesive must be hardenable in a conveniently short period of time at temperatures that are not so high that the abovementioned martensitic microstructure is adversely affected.

Another approach would be to use large headed bolts or screws (or conventional bolts with washers to increase the bearing area thereof) which would pass through holes in tab 65 and thread into bosses formed in shell 102 (similar to boss 119 in FIGS. 9 and 12), or into nuts. While this approach should be satisfactory, it would not be as economical as the preferred approach now to be described in conjunction with FIGS. 9–11.

Initially, a mounting arm such as the arm 41 is positioned adjacent to the outer periphery of the shell 102. Thereafter, and while the mounting arm is held in a desired position relative to the shell, a reinforcing strap or plate 96 having a pair of projections 97, 98 thereon is positioned over the motor mounting pad. Locating means (shown as apertures 101 in FIGS. 9–11) are defined by the motor mounting tab 65; and the projections 97, 98 co-operate with such locating means to permanently hold the mounting arm 41 in a fixed location on the shell 102. When the shell is about 0.050 inch thick, and tab 65 is about 0.035 of an inch thick, the plate 98 preferably is about 0.090 inch thick. This thickness of strap 96 prevents it from subsequently bending or buckling and also provides a mass that co-operates with the mass of shell 102 to provide heat sink means or heat transfer means that (it is believed) prevent adverse heat build-up and microstructure changes in the tab 65.

The preferred sequential process steps include positioning a mounting arm (e.g., arm 41) adjacent to a motor shell, positioning a reinforcing plate adjacent to the mounting arm, and positioning projection means so that the projection means interfit with locating means defined by the tab 65 of the mounting arm. Thereafter, a welding electrode is relatively positioned adjacent to one side of the motor shell 102 and a second welding electrode is positioned adjacent to the reinforcing plate; and current is passed through the welding plate, projections, and the interface between the projections and the shell while the parts being welded are urged together so as to accomplish a weld along such interface (as best illustrated at 103, 104 in FIG. 11), and heat is transferred to the heat sink means to prevent substantial degradation of the microstructure of the tab 65.

While round apertures 101 have been shown, it will be appreciated that notches rather than holes could be provided along the edges 104, 106 of the motor mounting pad 65. Other alternative arrangements of locating means will readily suggest themselves to persons skilled in the art and, accordingly, the forms illustrated herein should be considered for purposes of exemplification rather than limitation.

Figure 14:
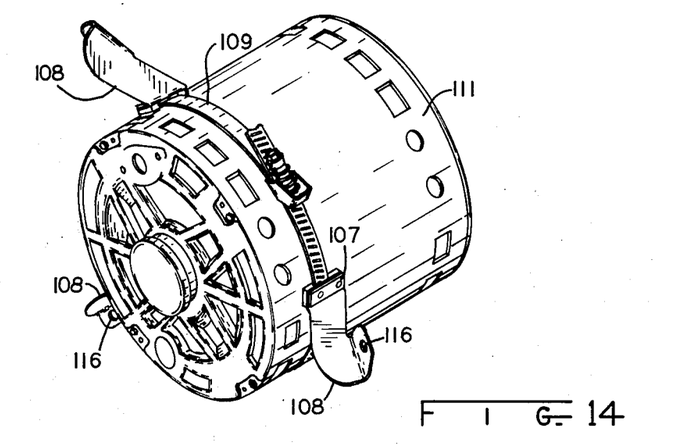
FIG. 14 illustrates a somewhat modified mounting arrangement.

My investigations have revealed that mounting arrangements retaining the suitable properties and characteristics mentioned above may also be provided even though parts thereof are not permanently fixed to the motor shell itself. For example, the arrangements shown in FIGS. 14-16 reveal that the invention may also be embodied in arrangements wherein a reinforcing plate 107 (including projections) that is substantially identical to the plate 96 may be welded to a notched backing or support plate 103, with the motor end or pad 112 of the mounting arm 108 permanently trapped therebetween. The mounting arm 108 is virtually identical to the mounting arm 41 described hereinabove and therefore further details thereof are not described herein. It is noted, however, that plate 103 and plate 107 constitute heat sink means for the FIG. 15 embodiment; and that projections on plate 107 (or plate 103) tend to concentrate and localize welding heat in the same manner as projections 97, 98 of FIG. 10. The band 109 is, as shown in FIG. 14, clamped about a motor 111.

Figure 15:
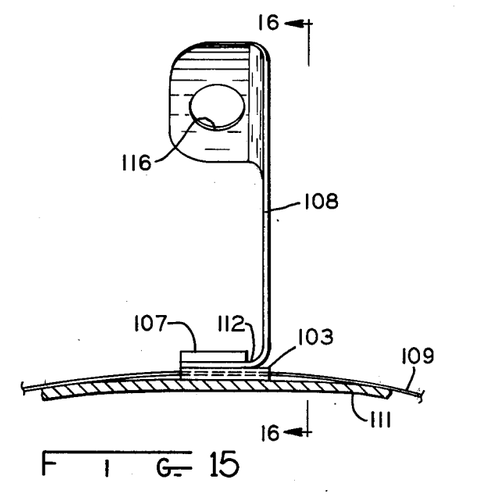
FIG. 15 is an enlarged view, with parts removed and parts in section, of a portion of the structure shown in FIG. 14.
Figure 16:
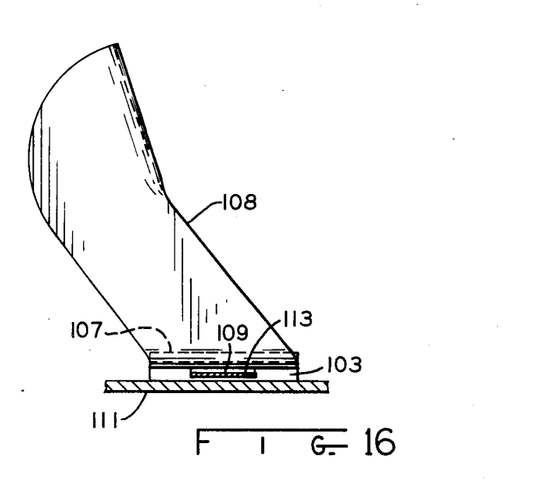
FIG. 16 is a view taken along the lines 16—16 in FIG. 15.

In a preferred mode of assembly, the plate 107 is positioned so that projection means thereon trap locating means in the mounting pad 112 against plate 103. Thereafter, one electrode is positioned above the plate 107 and another below the plate 103 whereupon the projections are welded to the other plate to permanently trap arm 112 and define a ligature accommodating notch or aperture 113. The ligature (such as strap 109) is then threaded through such notch, and thereafter fastened about a motor.

Figure 17:
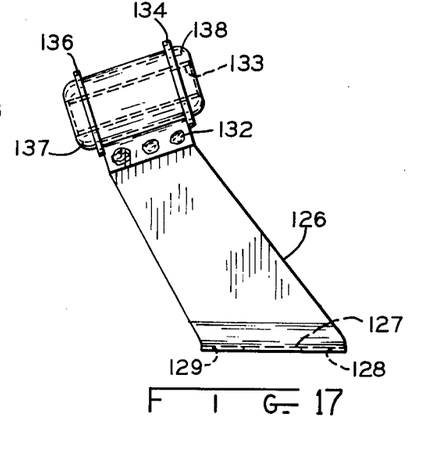
FIG. 17 is a side view of another arm useful in the practice of the invention.
Figure 18:
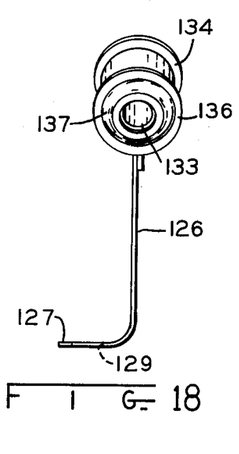
FIG. 18 is a front view of the structure illustrated in FIG. 17.
Figure 19:
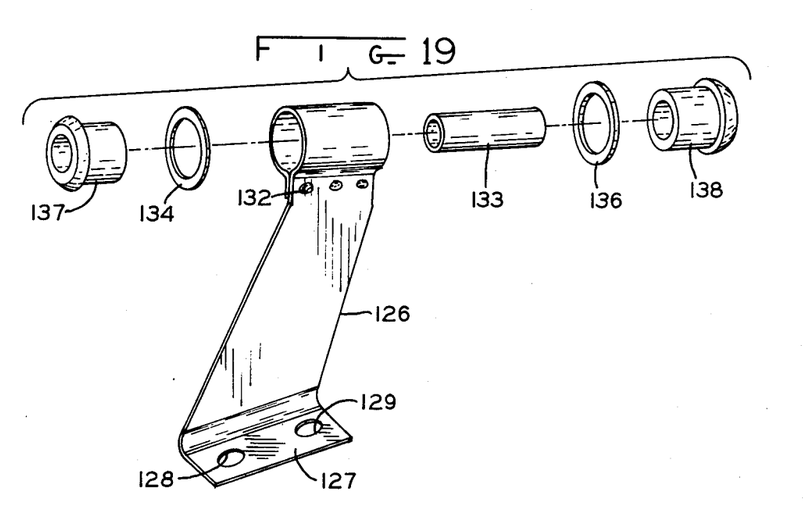
FIG. 19 is an exploded perspective view of the mounting members illustrated in FIGS. 17 and 18.

Turning now to FIGS. 17-19, another structural embodiment will be described. In the structure there shown, a mounting arm 126 is provided with a motor pad 127 which has locating means 128, 129 (again in the form of apertures) that are used in conjunction with fastening the mounting arm to a motor or other structure. Rather than utilizing a flat offset blower pad, the blower end of the arm 126 is rolled into a tubular shape and welded upon itself at 132. Thereafter, a spacer sleeve 133, two washers 134, 136, and rubber or other resilient material grommets 137, 138 are assembled therewith. Thereafter, a bolt, screw, or other suitable fastener is inserted through the center of the spacer sleeve to fasten the mounting arm to a blower housing. With the arrangement just described, the blower end of arm 126 is free to pivot about such fastener even though it is not offset in the manner described hereinabove in connection with FIG. 20.

It will be noted that welding (at 132) of the martensitic material utilized for the arm 126 has just been indicated. Even though welding may alter the desirable martensitic characteristics of that portion of the arm 126 in the vicinity of the weld, the mounting arm still seems suitable for use because (it is believed) any changes in martensitic microstructure are probably localized near the location of weld 132 and this region of arm 126 is not subjected to as great a stress as that portion closer to tab 127.

Figure 20:
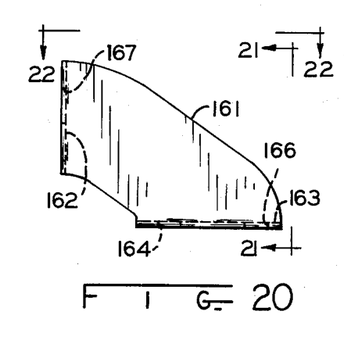
FIG. 20 is an elevation of another arm useful in carrying out of of the invention.
Figure 21:
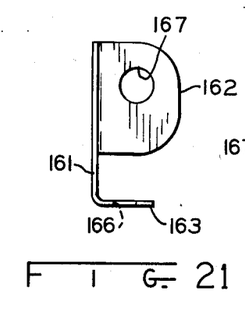
FIG. 21 is a view along lines 21—21 in FIG. 20.
Figure 22:
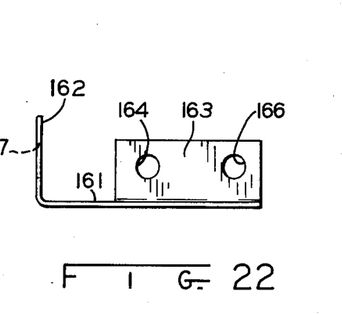
FIG. 22 is a view along lines 22—22 in FIG. 20.

In FIGS. 20-22 three different elevations of a torsionally flexible mounting arm 161 have been shown. The arm 161 includes a blower end tab 162 and motor tab 163 with projection accommodating apertures 164, 166 therein. The tab 162 also has a hole 167 therein which can be used to accommodate a rubber grommet like the grommet 79 (of FIG. 12). Three or more arms 161 may be used in lieu of arms 41-43 and these shorter arms 161 are of particular benefit for double shaft motor applications (such as room air conditioners) where the arm 161 would be fastened at the extreme end of a shell and mount the motor to a compartment wall rather than the eye of a blower.

Prior to the present invention, many attempts have been made to provide direct mounted motors that would have suitable vibration transmissibility characteristics. Even though many efforts have been made in this direction, and much patented literature is available illustrating such efforts, two arrangements with which I am familiar that have most closely approached the desired characteristics are illustrated as prior art in FIGS. 25-28.

Figure 27:
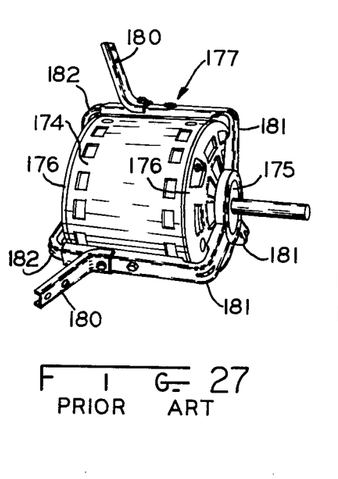
FIGS. 27 and 28 are perspective views of a motor, and blower mounted motor respectively, according to another current but prior art approach.
Figure 28:
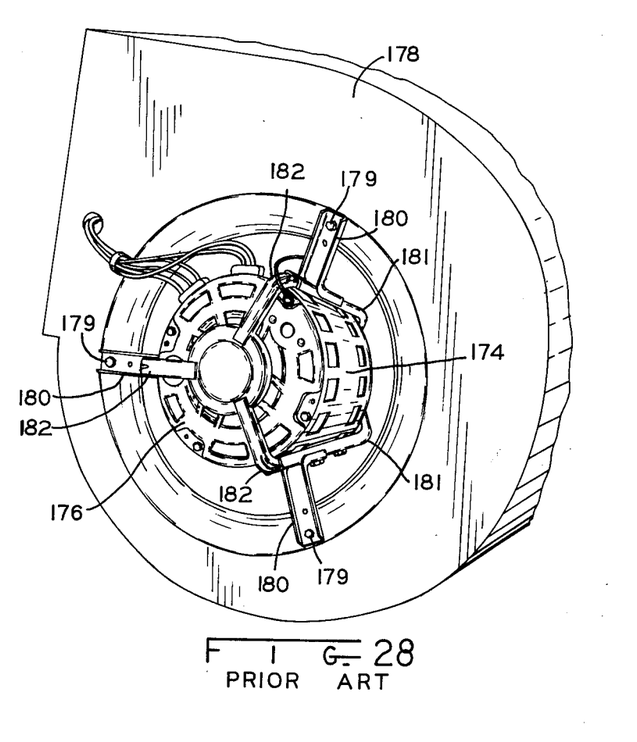

FIGS. 27 and 28 illustrate a rather complex mounting structure which is assembled from a plurality of parts and fastened to a motor 174 by means of resilient end rings or hubs 175 that are carried by the motor end frames 176. The bracket assembly 177 then is mounted to a blower housing 178 by means of a number of bolts 179, all as illustrated in FIG. 28. The performance of structures illustrated in FIGS. 27, 28 has been adopted by many persons in the industry as a standard of reference for good vibration isolation systems, and many in the industry have utilized the arrangement shown in FIG. 28. However, this approach is expensive, and in this regard it will be noted that a number of different arms 180, 181, 182 must be fabricated and then assembled with rings 175. In addition, a considerable amount of time and labor is involved in actually assembling this supporting structure 177 with the motor 174.

Figure 25:
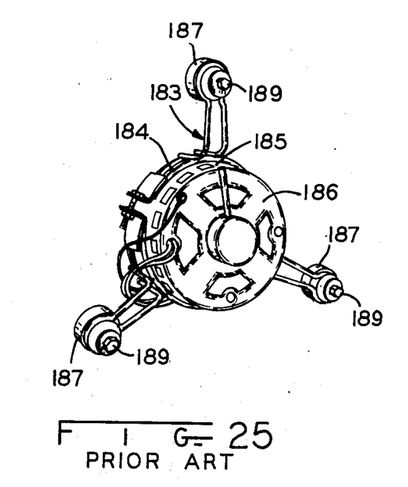
FIGS. 25 and 26 are perspective views of a motor, and blower mounted motor respectively according to one current but prior art approach.
Figure 26:
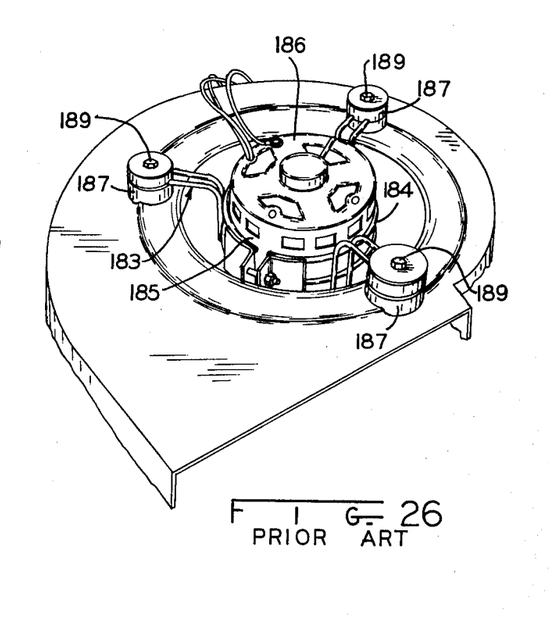

A somewhat less expensive approach is illustrated in FIGS. 25 and 26 wherein a wire type cage 183 is fabricated and then clamped with ligature means 184 to the outer periphery 185 of a motor 186. Relatively large resilient grommets or cushions 187 are then used to trap the ends of arm portions of the wire cage, and screws 189 are used to hold the entire structure on a blower housing 190.

Surprisingly, arrangements made according to the present invention yield performance characteristics and overall noise transmission qualities that generally are as good, if not better in at least one respect for each given design, than the best state of the prior art direct drive motor mounting arrangements of which I am aware — including those of FIGS. 25-28. In addition to having surprisingly good performance, arrangements made according to the present invention can now be made at substantially less cost than the prior suitable arrangements. Accordingly, substantial benefits can result from use of the present invention.

Accordingly, while I have now shown and described preferred and alternate forms of mounting arrangements, and methods of making the same (as well as components thereof); the disclosure contained herein should be construed as being exemplary, and the invention itself should be limited only by the scope of the claims that are appended hereto and that form part of my disclosure.

What I claim as new and desire to secure by Letters Patent of the United States is:

1. A method of manufacturing a torsional mode vibration isolating motor mounting system comprising a stationary motor member oriented along a longitudinally extending axis and a plurality of martensitic steel flexible motor supporting arms particularly adapted for supporting an induction motor, including the motor member, from a plurality of locations along a mounting structure and for establishing a torsional mode resonant frequency for the arrangement of less than $\sqrt{2}$ times the motor power supply frequency, and a tilting mode resonant frequency greater than twice the motor power supply frequency; wherein at least one of said arms has a radially extending portion of generally rectangular cross-section and also has a pre-selected thickness less than the width thereof, and wherein the at least one of said arms further has a motor mounting tab, said method comprising: positioning said at least one of said arms with the radially extending portion thereof oriented so that the thickness thereof is oriented in a direction generally transversely relative to the longitudinally extending axis, so that the width thereof is oriented in a generally parallel direction relative to the longitudinally extending axis, and so that the motor mounting tab thereof is closely adjacent to the stationary motor member, and positioning at least one weldable projection along a projection accommodating portion of the tab and positioning a mass of heat absorbing and tab reinforcing material adjacent to the tab with the tab sandwiched between the stationary motor member and mass of heat absorbing and tab reinforcing material so as to establish, with the motor member, heat sink means; welding the mass of heat absorbing and tab reinforcing material to said stationary motor member by passing welding current through the at least one projection; and dissipating welding heat caused by the welding current through the motor member and mass of heat absorbing and tab reinforcing material whereby excessive heating of the at least one of said arms due to the welding heat is avoided.

2. The method of claim 1 wherein dissipating welding heat comprises transferring heat to the mass of heat absorbing and tab reinforcing material and to the stationary motor member during the welding step, thereby to avoid destruction of the martensitic characteristics of the at least one of said arms.

3. The method of claim 2 wherein the mass of heat absorbing and tab reinforcing material includes two weldable projections and the step of welding includes relatively positioning electrodes respectively adjacent to the motor member, and to the mass of heat absorbing and tab reinforcing material.

4. A method of manufacturing a torsionally flexible vibration isolating electric motor mounting arrangement comprising first and second weldable members that cooperate as heat sink means, and a flexible mounting arm having a motor end with projection accommodating means therein, said method comprising: positioning together the flexible mounting arm, the first weldable member, and the second weldable member, and trapping the motor end of the flexible mounting arm between the first and second weldable members with at least one weldable projection on the second weldable member accommodated by the projection accommodating means of the mounting arm; engaging the first and second weldable members with electrodes, relatively urging the first and second weldable members toward one another, passing welding current through the first and second weldable members thereby to weld the at least one projection to the first weldable member at an interface therebetween, and dissipating welding heat caused by the welding current along the heat sink means whereby excessive heating of the mounting arm is minimized.

5. The method of claim 4 wherein the first weldable member is the shell of the motor; the second weldable member and the shell of the motor cooperate as heat sink means, and the flexible mounting arm is formed from martensitic steel.

6. The method of claim 4 wherein the first weldable member and second weldable member together comprise, after welding of the projection, a block having a slot therethrough; and the method further comprises threading a strap through the slot.

7. The method of claim 6 further comprising: fastening the strap to a motor and thereby fastening the block and flexible arm to the motor.

* * * * *